United States Patent [19]

Schlotman et al.

[11] Patent Number: 4,580,601

[45] Date of Patent: Apr. 8, 1986

[54] TWO-PART RISING CAP FOR FAUCETS

[75] Inventors: Walter F. Schlotman, Bay Village; Raymond M. Grella, Elyria, both of Ohio

[73] Assignee: Stanadyne, Inc., Windsor, Conn.

[21] Appl. No.: 646,252

[22] Filed: Aug. 31, 1984

[51] Int. Cl.⁴ ............................................. F16K 11/02
[52] U.S. Cl. ............................................... 137/625.17
[58] Field of Search ........................... 137/625.17, 315

[56] References Cited

U.S. PATENT DOCUMENTS

| | | | |
|---|---|---|---|
| 3,287,985 | 11/1966 | Moen | 137/625.17 |
| 3,554,232 | 1/1971 | Kappel et al. | 137/625.17 |
| 3,592,229 | 7/1971 | Moen | 137/625.17 |
| 3,726,316 | 4/1973 | Moen | 137/625.17 |
| 3,773,079 | 11/1973 | Moen | 137/625.17 |
| 3,782,417 | 1/1974 | Moen | 137/625.17 |
| 3,807,453 | 4/1974 | Dom et al. | 137/625.17 |
| 4,103,709 | 8/1978 | Fischer | 137/625.17 X |
| 4,183,376 | 1/1980 | Moen | 137/625.17 |

Primary Examiner—Alan Cohan
Assistant Examiner—John A. Rivell
Attorney, Agent, or Firm—Kinzer, Plyer, Dorn & McEachran

[57] ABSTRACT

A single-handle faucet has a faucet housing with a mixing valve cartridge disposed therein. The valve cartridge includes a fixed sleeve and a movable stem. A two-part rising cap is connected to the valve stem. An operating handle extends through an opening in the rising cap and is pivotally connected to the sleeve. The two part rising cap is split into first and second parts which are joined along mating surfaces by cooperating pin and hole pairs. The rising cap opening is defined by adjoining slots formed in each of the first and second parts, allowing the rising cap to be assembled about a previously installed handle.

4 Claims, 10 Drawing Figures

U.S. Patent   Apr. 8, 1986   Sheet 1 of 2   4,580,601
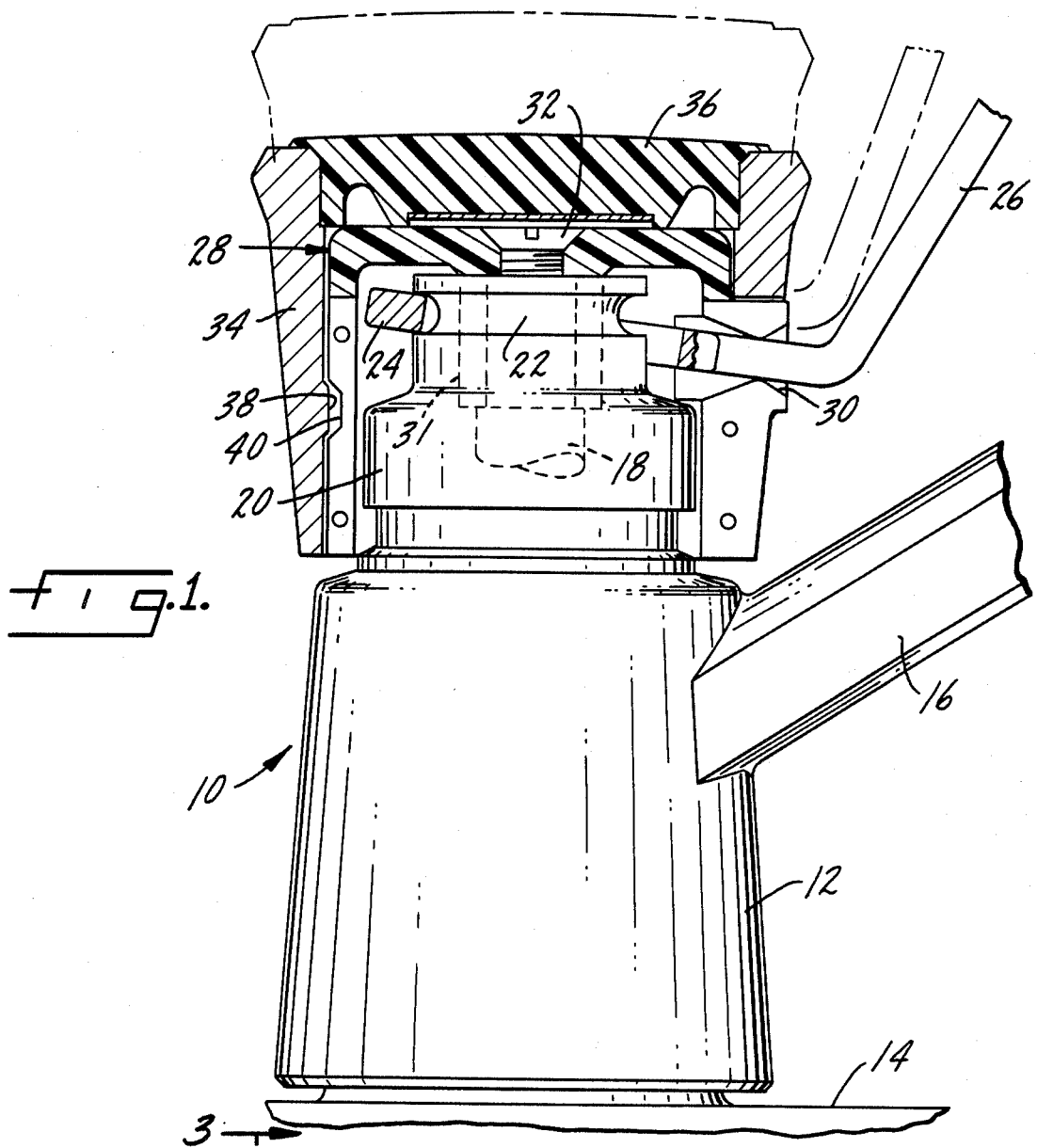
fig.1.
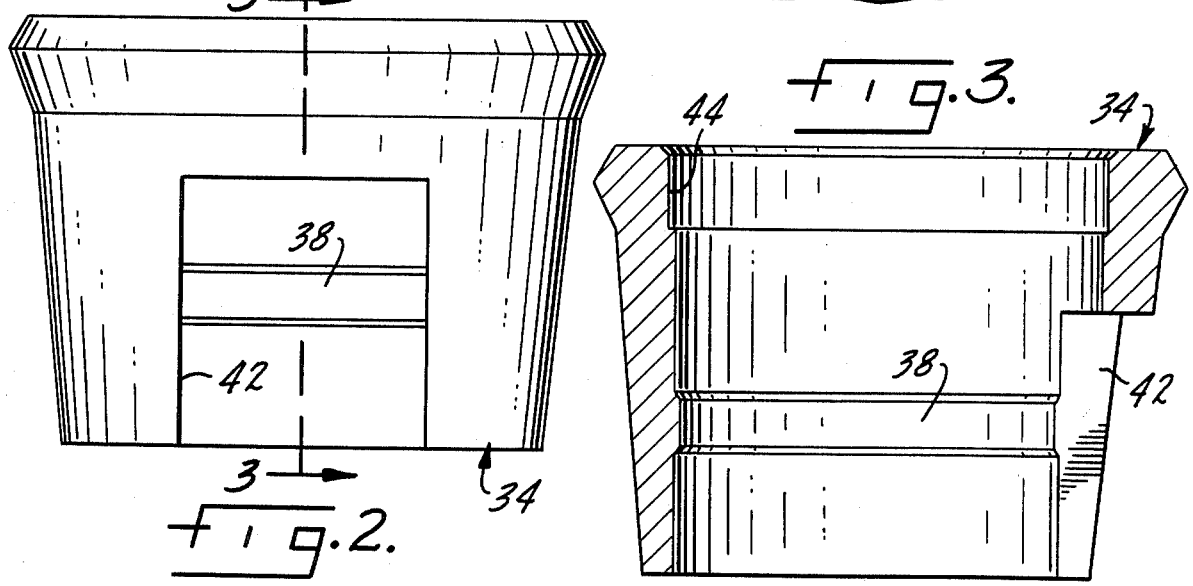
fig.2.
fig.3.

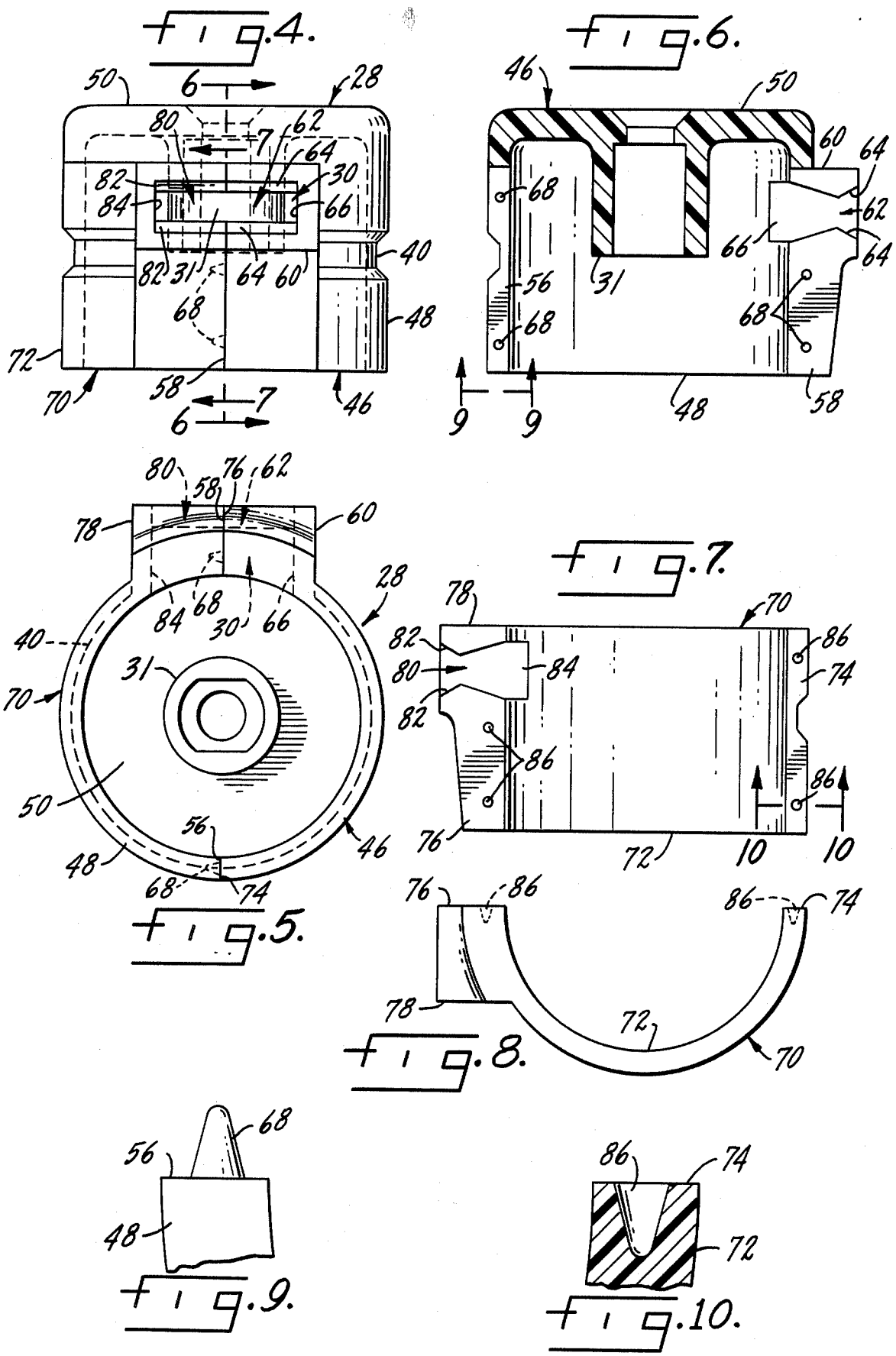

4,580,601

TWO-PART RISING CAP FOR FAUCETS

SUMMARY OF THE INVENTION

This invention relates to plumbing fixtures and is particularly concerned with an improved rising cap for a single-handle faucet.

A primary object of the invention is a rising cap for a single-handle faucet which simplifies assembly of the faucet by permitting the operating handle to be connected to the valve cartridge before the cartridge is covered by the rising cap.

Another object of the invention is a two-part rising cap which eliminates the need for "fishing" for the pivot nut during installation of the operating handle.

Another object of the invention is a rising cap which eliminates false assemblies and the need to reassemble the faucet mechanism.

Another object of the invention is a rising cap which provides visible assembly of the operating handle.

Another object of the invention is a rising cap which assures first-time, everytime assembly of the handle onto the pivot.

Other objects will appear from time to time in the following specification, drawings and claims.

BRIEF DESCRIPTION OF THE DRAWINGS

FIG. 1 is a partial sectional view of a faucet according to the present invention.

FIG. 2 is a side elevation view of a handle pivot cap.

FIG. 3 is a section of a handle pivot cap taken along line 3—3 of FIG. 2.

FIG. 4 is a side elevation view of the two-part rising cap of the present invention.

FIG. 5 is a bottom plan view of the two-part cap.

FIG. 6 is a section taken along line 6—6 of FIG. 4.

FIG. 7 is a view taken along line 7—7 of FIG. 4.

FIG. 8 is a bottom plan view of the rising cap part of FIG. 7.

FIG. 9 is a view looking in the direction of line 9—9 of FIG. 6.

FIG. 10 is a section taken along line 10—10 of FIG. 7.

DETAILED DESCRIPTION OF THE INVENTION

A single-handle faucet 10 is shown in FIG. 1. A faucet housing 12 is mounted on a base 14 and has a spout 16 extending therefrom. A mixing valve cartridge is disposed within the housing 12. The valve cartridge may for example be of the type shown in U.S. Pat. No. Re. 25,920 or U.S. Pat. No. 4,103,709. The invention should not be limited to use with a valve structure of the type shown in said patents as the described rising cap construction has application with any type of single lever mixing valve. The mixing valve has an operating stem shown at 18. The stem is capable of rotating and translating axially within a sleeve (not shown). A pivot nut 20 is fixed to the top of the valve cartridge sleeve. Near the top of the pivot nut 20 is a groove 22 which receives the interior hook portion 24 of an operating handle 26. The hook 24 surrounds the upper end of the pivot nut 20.

The two-part rising cap 28 of the present invention has an opening 30 through which the handle 26 extends. The rising cap surrounds the pivot nut 20 and has a hub 31 connected to the stem 18 of the mixing valve cartridge by a screw 32. The hub 31 extends through an opening in the top of the pivot nut 20. Thus, when a user moves the handle 26, either up and down or from side to side, that motion is transferred to the mixing valve stem 18 by the rising cap 28. The pivot nut 20 serves as an internal bearing for the hub 31 and an external bearing for handle hook 24. Further details of the rising cap will be described below.

A handle pivot cap 34 surrounds the rising cap. An insert bezel 36 fits on top of the handle pivot cap 34. A tongue 38 on the interior surface of the pivot cap 34 engages a groove 40 around the exterior of the rising cap 28 to hold the pivot cap on the rising cap. The pivot cap 34 is sufficiently snug about the rising cap to hold the two parts of the rising cap together.

Looking now at FIGS. 2 and 3, further details of the pivot cap 34 are shown. The pivot cap has a three-sided opening 42 which extends to the bottom edge of the pivot cap. This allows the cap to clear the handle 26 as the cap is placed on the rising cap. An annular groove 44 is provided on the top of the pivot cap to accommodate the bezel 36.

Turning now to FIGS. 4–10, details of the rising cap 28 are shown. The rising cap 28 is split into first and second parts. The separation line between the two parts extends through the opening 30. Thus, the opening is defined by adjoining slots formed in each of the first and second parts. The first part 46 of the rising cap 28 is shown in FIG. 6. In this embodiment, the first part 46 includes a semi-cylindrical wall 48 and an integral cover portion 50. The central hub 31 projects downwardly from the cover and connects to the stem of the valve cartridge as shown in FIG. 1. The wall 48 terminates at mating surfaces 56 and 58. The wall 48 has a projection 60 of increased thickness at its end near the mating surface 58. A slot 62 is formed in this projection. The slot extends to the mating surface 58. The slot has shoulders 64 formed on its top and bottom surfaces. The shoulders provide a line contact with the operating handle, permitting the handle to pivot with respect to the rising cap without binding. In addition to the upper and lower surfaces 64, the slot 62 has a side surface 66. The slot is open at the mating surface 58. A plurality of pins 68 are formed on the mating surfaces 56 and 58. As shown in FIG. 9, the pins have a conical shape projecting from the mating surfaces.

The second part 70 of the rising cap is shown in detail in FIGS. 7 and 8. The second part includes a semi-cylindrical wall 72 terminating at mating surfaces 74 and 76. A projection 78 of increased thickness is formed at the edge near the mating surface 76. This projection is shaped the same as the projection 60 on the first part 46. Similarly, there is a three-sided slot 80 formed in projection 78. The slot includes shoulders 82 on the upper and lower surfaces and a side edge surface 84. The slot is open on the remaining side. A plurality of holes 86 are formed in the mating surfaces 74 and 76. As seen in FIG. 10, the holes 86 have a conical shape arranged to receive the pins 68 on the first part of the rising cap.

It can be seen in FIGS. 4 and 5 that the first part 46 and the second part 70 of the rising cap fit together to form the complete rising cap 28. The first and second parts are joined along cooperating mating surfaces, with the surfaces 58 and 76 adjoining each other while on the other side the surfaces 56 and 74 adjoin. Also, the top land of the wall 72 fits against the underside of the cover 50. The pins 68 fit in the holes 86 to guide the two parts together during assembly. The semi-cylindrical walls 48 and 72 combine to form a complete cylinder. Also, the three-sided slots 62 and 80 are aligned such that they define the opening 30 through the rising cap. When the two parts are joined together, the opening 30 is enclosed on four sides as the pairs of shoulders 64 and 82 define upper and lower boundaries of the opening while the surfaces 62 and 84 define the side boundaries of the opening.

The structure of the rising cap of the present invention greatly facilitates assembly of the faucet. In the past, it has been necessary to blindly insert the hook portion 24 of the handle 26 into the groove 22. This resulted in many false assemblies which required reassembly of the mechanism. With the two-part rising cap of the present invention the operating handle 26 can be hooked on to the groove 22 before the rising cap is connected to the stem. This is made possible by splitting the rising cap through the opening so that the rising cap can be assembled about the operating handle. Once this has been done and the screw 32 has been secured, the pivot cap 34 is placed down over the rising cap with the slot 42 accommodating the handle 26.

While the description above has focused on a two-part rising cap, it will be understood that the concept of splitting a cap through its handle opening could also be applied to a non-rising cap. A non-rising cap is mounted for rotation but not translation on either the valve cartridge sleeve or the faucet body. The end of the operating handle is connected to the valve stem. The handle extends through an opening in the non-rising cap and is pivoted thereto. The opening in the non-rising cap would include bearings for the pivot stub shafts on the handle.

Whereas a preferred form of the invention has been shown and described, it should be understood that suitable modifications, changes and alterations may be made without departing from the invention's fundamental theme. For example, the opening 30 could have a configuration other than the rectangular one shown. Or a three-sided opening could be formed entirely in a mating surface of one part with no slot in the cooperating mating surface of the other part. The other part would simply provide the fourth side surface to close up the opening.

We claim:

1. For use in a faucet of the type having a faucet housing, a valve cartridge in the housing, and a pivot nut connected to the valve cartridge;

a rising cap connected to the valve cartridge, an operating handle extending through an opening in the rising cap and being pivotally and rotationally connected to the pivot nut, said rising cap comprising first and second parts joined together along cooperating mating surfaces, the rising cap opening being defined by adjoining slots formed in each of the first and second parts, said rising cap first part including a semicircular wall extending the full height of the rising cap and integrally connected to a cover, the second part including a semicircular wall extending the full height of the rising cap, with the integral cover of said first part forming the entire cover for said rising cap.

2. The structure of claim 1 further comprising a handle pivot cap fitting over the rising cap.

3. The structure of claim 2 further characterized by and including means for interlocking said handle pivot cap and said rising cap for simultaneous movement.

4. The structure of claim 1 wherein the rising cap mating surfaces include cooperating pairs of pins and holes.

* * * * *